United States Patent [19]

Palau et al.

[11] 4,244,399
[45] Jan. 13, 1981

[54] SHED LOCATING DEVICE FOR DOBBIES

[75] Inventors: Joseph Palau, Duingt; Pierre Bourgeaux, Poisy, both of France

[73] Assignee: Societe Anonyme des Etablissements Staubli, Faverges, France

[21] Appl. No.: 14,530

[22] Filed: Feb. 23, 1979

[30] Foreign Application Priority Data

May 31, 1978 [FR] France .................. 78 16964

[51] Int. Cl.³ .................................... D03D 51/00
[52] U.S. Cl. .................................................... 139/1 E
[58] Field of Search .................... 74/661; 139/1 E, 59

[56] References Cited

U.S. PATENT DOCUMENTS

| 3,356,109 | 12/1967 | Neyraud | 139/1 E |
|---|---|---|---|
| 3,370,484 | 2/1968 | Lovercheck | 74/661 |
| 3,661,185 | 5/1972 | Fumat | 139/1 E |
| 3,732,895 | 5/1973 | Keim | 139/1 E |
| 3,828,824 | 8/1974 | Macho | 139/1 E |
| 3,941,161 | 3/1976 | Neyraud | 139/1 E |

Primary Examiner—Henry Jaudon
Attorney, Agent, or Firm—Dowell & Dowell

[57] ABSTRACT

A shed locating device, interposed between a dobby and the shed forming of a mechanism corresponding weaving loom, of the type comprising an auxiliary motor associated with a dog clutch mechanism for coupling the shaft of said motor to the shaft of the mechanism after disconnection of the mechanism shaft from the shaft of the loom, which dog clutch mechanism comprises a sliding collar member coupled rotationally to the shaft of the mechanism and provided with two series of dog clutch teeth adapted to cooperate selectively with one or the other of two corresponding plates respectively fixed in rotation with the shaft of the loom and with the shaft of the auxiliary motor, wherein the two series of dog clutch teeth of the sliding collar member are provided on two separate ring pieces capable of moving in the axial direction independently of one another against resilient spring return means.

4 Claims, 4 Drawing Figures

SHED LOCATING DEVICE FOR DOBBIES

The invention relates to dobby controlled looms and more particularly to the devices associated with the machines of this type with a view to automatically locating the shed.

It is known that, in order to obtain a perfect synchronism between the lifting of the heddle shafts and the reciprocating movement of the weft-threader member, the dobbies or other similar mechanisms for controlling the shed are directly driven by the weaving loom itself. However, it may happen that, further to the break of a weft yarn or of a defect in weaving, it is necessary momentarily to disconnect the dobby from the loom and to drive said dobby in reverse or forwardly and at slow speed over one or more revolutions so as to find the synchronism again and to allow the correct running of the loom. These disconnecting and momentary slow drive operations are generally effected automatically by a mechanism known as a "shed locating device."

Different arrangements have been proposed in practice for the devices of this type. In the majority of cases, the connection between the shaft of the loom and the shaft of the dobby is ensured by a dog-clutch mechanism which enables the two shafts mentioned hereinabove to be disconnected, and enables the shaft of the dobby to be meshed with the driven shaft of a gear-down mechanism associated with an auxiliary electric motor. This arrangement has, in principle, the advantage of simplicity, but due to the magnitude of the torque which the mobile members of the dobby impart on the input shaft of said dobby and which occurs particularly during the disconnection of the auxiliary motor and dobby, and reconnection of the dobby and the loom, the control of the displacement of the sliding clutch collar necessitates a very considerable effort and provokes jerks which frequency cause damage to the whole of the device.

The improvements forming the subject matter of the present invention envisage remedying this drawback and providing a device for locating the shed which is perfectly reliable in operation.

According to the invention, the sliding collar connected angularly to the shaft of the dobby and provided at its two ends with dog clutch means adapted to cooperate selectively with corresponding means fixed for rotation with the shaft of the loom, respectively with the driven shaft of the auxiliary gear-down system, is constituted by two independent rings adapted to separate axially from each other against yieldable resilient means which tend to return them into contact.

It will readily be appreciated that this arrangement considerably improves the functioning of the device since only one of the two rings of the sliding collar is subjected to a drive torque, so that the other ring may cooperate without load with the dog clutch plate of the loom which will ensure immediately afterwards the drive of the dobby.

The invention will be more readily understood on reading the following description with reference to the accompanying drawings, in which.

Figure 1:
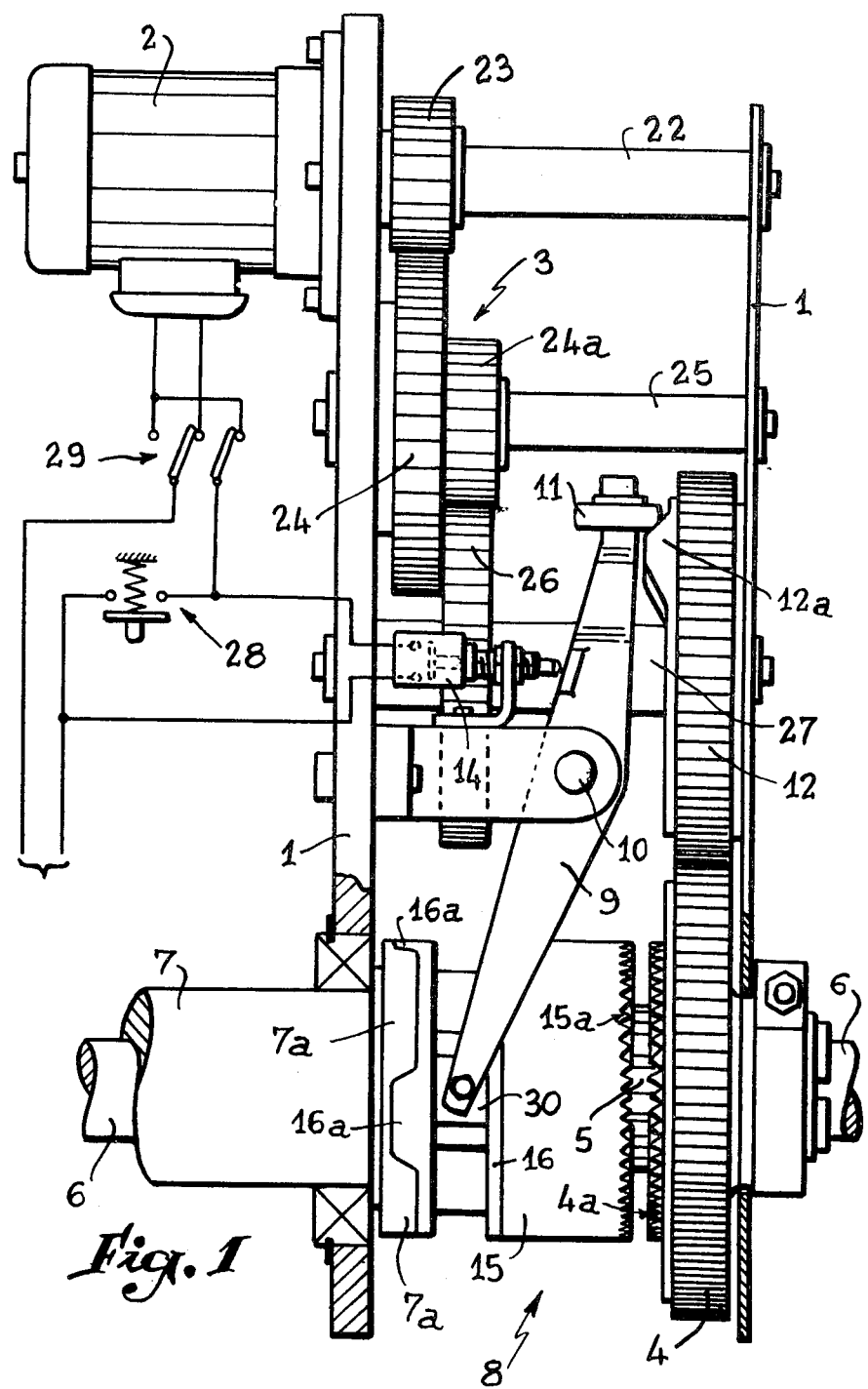
FIG. 1 is a side view showing the general arrangement of a device for locating the shed established according to the invention.

The device shown in FIG. 1 comprises a fixed frame which, in the embodiment in question, is formed by two suitably braced vertical side members 1. This frame supports an auxiliary electric motor 2 of which the shaft 22 is connected, via a gear-down train 3 housed between the above-mentioned side members, to a gear wheel rotatably mounted on a smooth bearing surface of a splined sleeve 5, which is angularly and axially fixed to the input shaft 6 of the dobby or other shed-forming mechanism. The gear train 3 includes a gear 23 fixed to the motor shaft 22 and driving gears 24 and 24a, which drive gears 26 and 12 carried by the idler shaft 27, the gear 12 driving the gear wheel 4. It will be noted that the side face of the gear wheel 4 which is facing inside of the frame bears regularly distributed dog-clutch teeth 4a.

The shaft of the dobby 6 is concentric with the shaft of the loom 7, provided to be tubular in form. This shaft 7 extends, between the side members 1 of the frame, with a dog-clutch plate 7a of which the teeth are distributed angularly and irregularly. For the shaft of the dobby 6 to be able to be selectively connected either to the shaft 7 of the loom, or to the gear wheel 4 driven by the auxiliary motor 2, the splined sleeve 5 slidably supports a sliding collar 8 which will be described in detail hereinafter and whose axial control is ensured by a fork member 9 articulated at 10 on the fixed frame. The upper end of this fork member 9 is equipped with a roller 11 which rolls in contact with a cam 12a provided laterally on one, referenced 12, of the pinions of the gear-down train 3. With this fork member 9 is associated an electric contactor 14 placed in the feed circuit of the motor 2 which includes a push-button switch 28 to start the motor and a manually positionable reversing switch 29 by which the operator can select the direction in which he wishes the motor 2 run.

Figure 2:
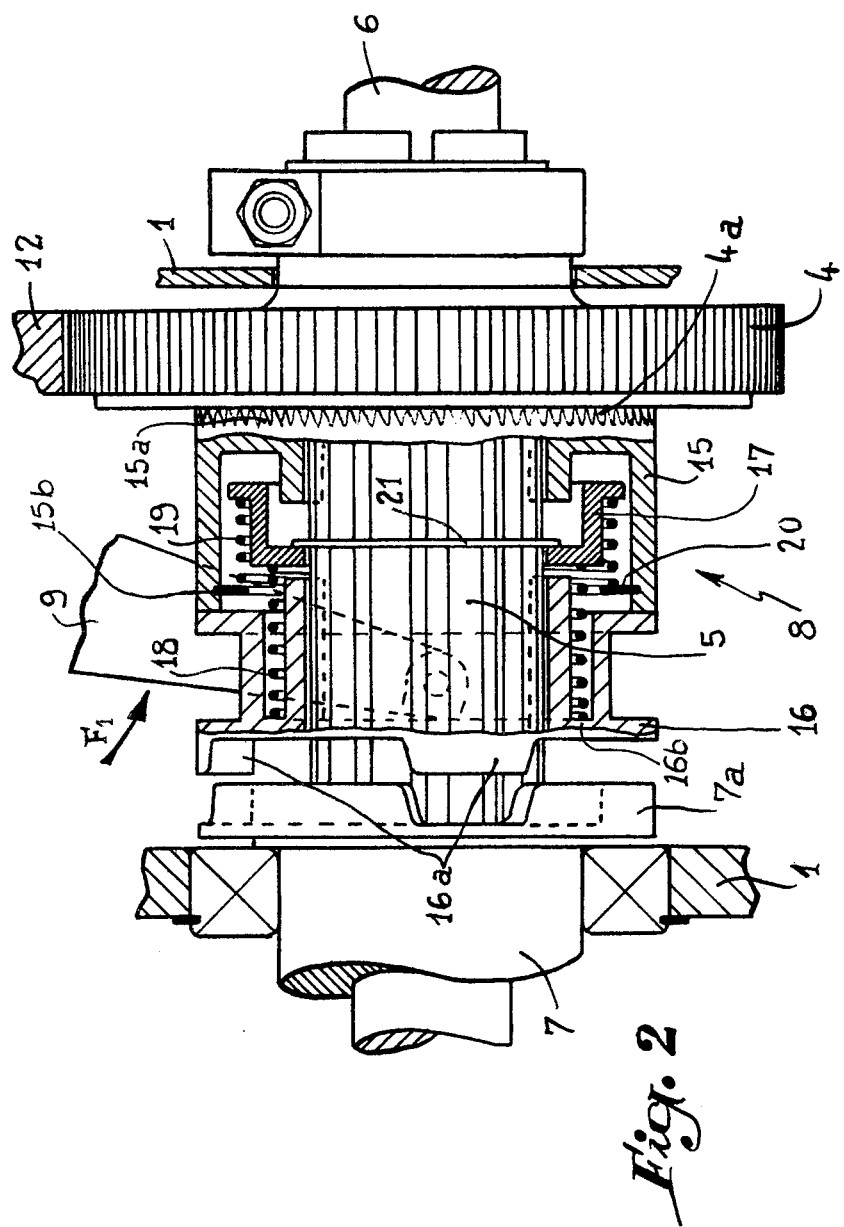
FIG. 2 is a partial axial section showing on a larger scale the dog clutch mechanism, the pieces being shown during normal functioning of the weaving loom.
Figure 3:
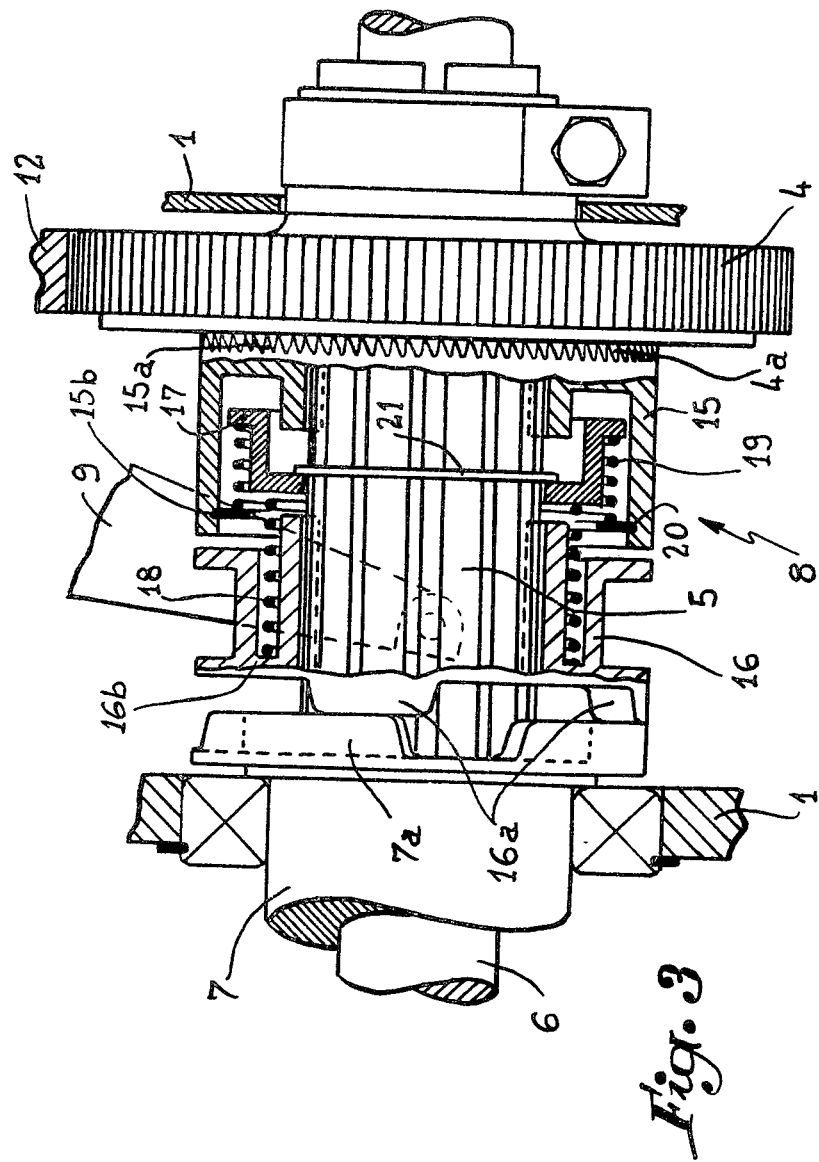
FIG. 3 is a section similar to FIG. 2, the pieces being shown when the shaft of the dobby is disconnected from the shaft of the loom.
Figure 4:
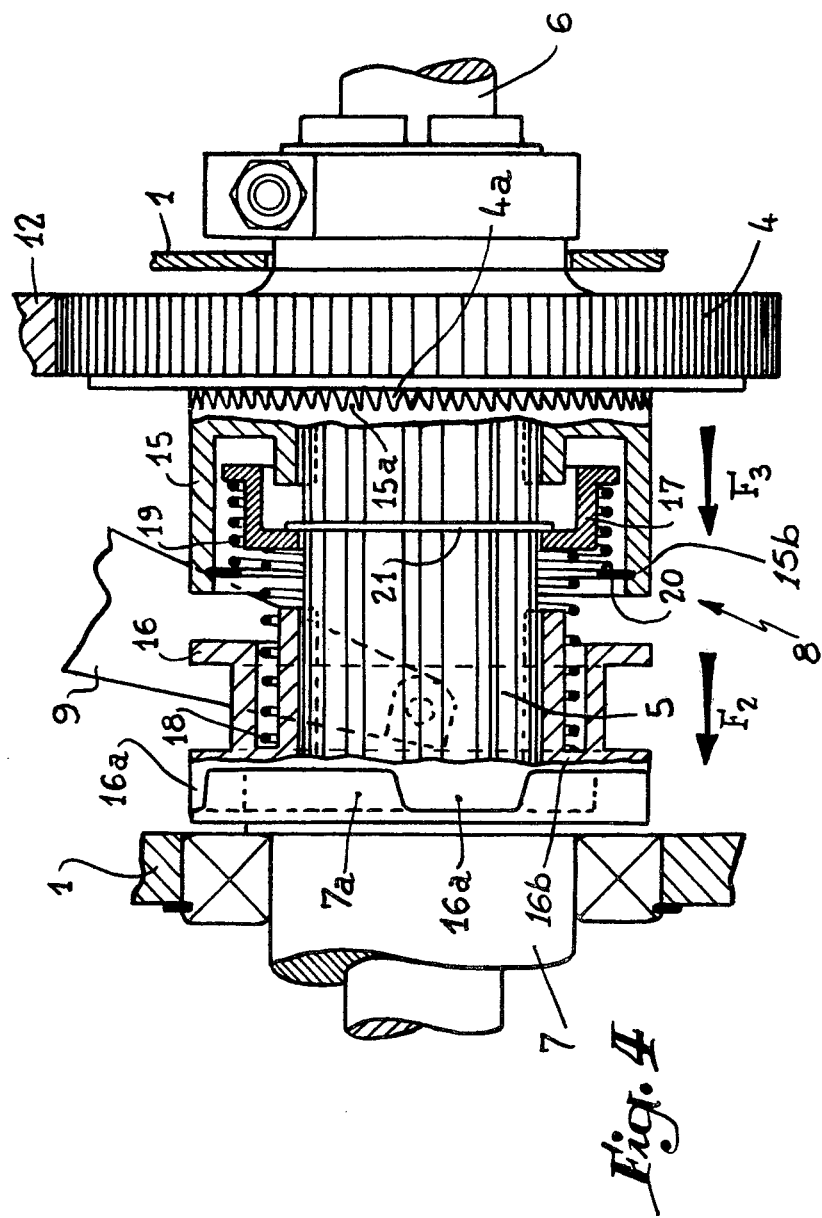
FIG. 4 is a section similar to FIG. 2, the pieces being shown when one of the rings is returning to its initial position, just before reconnection of the dobby to the loom shaft as shown in FIG. 1.

As is shown more particularly in FIG. 2, the sliding collar 8 is formed by two rings 15 and 16, independent of each other; each of these rings presents two concentric cylindrical walls, the inner wall being splined in order to cooperate with the splined sleeve 5 on which it may slide axially. On this sleeve 5 is also mounted an annular stop 17 which is slidable thereon and against which the springs 18 and 19 abut. These springs 18 and 19, the first abutting against the closed base of the ring 16, the second against an inner ring 20 fixed in a groove 15b inside the ring 15, tend to maintain the annular stop 17 applied against a retaining ring 21 axially fixed in a groove on the said splined sleeve 5. The annular stop 17 is essentially fixed since it is always against the ring 21, and the springs 18 and 19 yieldably urge the rings 16 and 15 respectively leftwardly as seen in FIGS. 2, 3 and 4, each spring acting independently of the other.

The free end of the ring 15 bears lateral dog clutch teeth 15a arranged so as to cooperate with the said teeth 4a of the gear wheel 4. Similarly, the free edge of the ring 16 is cut to present teeth 16a adapted to mesh between the irregular teeth of the plate 7a of the shaft 7 of the loom. It will further be noted that the lower end of the control fork member 9 is coupled to the ring 16 of the sliding collar 8, as may be clearly seen in FIG. 1.

FIG. 1 illustrates the position of the mobile pieces of the device according to the invention during normal functioning of the weaving loom. The auxiliary motor 2 is not supplied with current; the springs 18 and 19 elastically maintain the assembly 8 constituted by the rings 15 and 16 pushed in the direction of the shaft 7 of the loom, so that the dog teeth 16a and 7a are in mesh. The spring 19 urges the ring 15 in the direction of the ring 16, so that the dog teeth 15a cannot intermesh with the teeth 4a of the gear wheel 4. The movement of rotation of the shaft 7 is thus transmitted by the ring 16 to the splined sleeve 5 and to the shaft 6 of the dobby.

For locating the shed case of a malfunction of the loom, the loom is first stopped, whereby the shaft 7 thus becomes angularly immobilised. At the same time, the auxiliary motor 2 is supplied with current by pushing the switch 28, so that the cam 12a carried by the gear 12 of the gear-down train 3 causes the form member 9 to tip in the direction of arrow F1 of FIG. 2, and close the switch 14 connected in parallel with the switch 28, the pivoting of the fork member 9 thereby pushing the ring 16 axially in the direction of the gear wheel 4; the inner edge of this ring 16 abuts against the corresponding edge of the ring 15, so that the sliding collar assembly 8 moves rightwardly against the yieldable reaction exerted by the springs 18 and 19. The teeth 7a and 16a separate whilst the teeth 15a mesh between teeth 4a. Under these conditions it will be readily appreciated that the auxiliary motor 2 thus slowly drives the shaft 6 of the dobby through the ring gear-down train 3, the gear wheel 4, the ring 15 and the splined sleeve 5, the shaft 22 of the motor rotating oppositely to the direction of rotation of the loom shaft 7.

The cam 12a presenting only one boss 12a, the fork member 9 is displaced positively only a short instant of the beginning of the rotation of the auxiliary motor 2. As soon as this fork member is no longer urged by the cam 12a, the springs 18 and 19, previously compressed, tend to return the sliding collar assembly 8 leftwardly to the initial position of FIG. 1. Under these conditions, the ring 15 remains, however, axially engaged with the teeth 4a due to the effect of friction between the inner splined wall of said ring and the periphery of the sleeve 5, resulting from the high torque transmitted by these members. The ring 16, on the contrary, moves axially by a short distance and applies its teeth 16a against the face of the plate 7a (FIG. 3). However, it will be noted that since teeth 16a are not meshed, the tipping of the fork member 9 as a result of the small leftward axial displacement of the ring 16 is insufficient to stop the actuation of the switch 14, so that the auxiliary motor 2 continues to be supplied and to function.

It is only when the shaft 6 will have made a complete revolution that the teeth, which up to this moment have been sliding against the face of the plate 7a, will again be located opposite the recessed parts thereof and will be able to mesh therein. The ring 16 consequently moves axially towards the left (arrow F2 of FIG. 4); the re-engagement of the teeth being effected smoothly since the ring 16 then does not transmit any torque.

The axial displacement in the direction of F2 of the ring 16 has the effect of tipping the fork member 9 completely back again so that it returns to its original orientation of FIG. 1. The contactor 14 therefore interrupts the supply of the auxiliary motor 2 which stops, so that, as a result of stopping of the drive, the ring 15 is itself no longer subjected to any load and may easily slide in the direction of the ring 16 (arrow F3 of FIG. 4) solely under the action of the return spring 19. The sliding collar 8 has consequently returned to the initial position of FIG. 1, and the drive of the dobby by the shaft 7 of the loom will again occur.

Tests have shown that making of the sliding collar 8 in two separate parts capable of moving in the axial direction independently of each other makes it possible to obtain a particularly smooth and flexible functioning of the dog clutch mechanism. Any jerk prejudicial to maintaining the pieces of the shed locating device in a good condition is effectively eliminated, the angular manoeuvre of the fork member controlling the above mentioned mechanism not requiring any considerable effort.

What is claimed is:

1. A shed locating device to be interposed between the shaft of a dobby and the shaft of the shed-forming mechanism of a loom, the device comprising:

a frame supporting the dobby shaft in alignment with the shaft of the loom;

collar means axially slidable with respect to the dobby shaft and fixed for rotation therewith, and the collar means being rotatable about the loom shaft;

auxiliary motor means coupled to drive a ring gear rotatably supported on the dobby shaft, the auxiliary motor means being supported by the frame and being manually actuable to commence driving the ring gear;

a clutch plate carried by the loom shaft adjacent to one side of the collar means, and the clutch plate and the adjacent side of the collar means having teeth which interengage when the collar means is moved axially toward the plate, thereby coupling the dobby shaft to be driven by the loom shaft;

the ring gear being located adjacent the other side of the collar means, and the ring gear and the other side of the collar means having teeth which interengage when the collar means is moved axially toward the ring gear, thereby coupling the dobby shaft to be driven by the loom shaft;

the ring gear being located adjacent the other side of the collar means, and the ring gear and the other side of the collar means having teeth which interengage when the collar means is moved axially toward the ring gear, thereby coupling the dobby shaft to be driven by the ring gear;

the collar means comprising two separate rings located adjacent to each other; and means for selectively actuating the ring nearest the clutch plate to move both rings away therefrom in the direction of the ring gear.

2. The device as claimed in claim 1, wherein the separate rings comprising the collar means are coupled for rotation with the dobby shaft by splines which extend between said clutch plate and said ring gear.

3. The device as claimed in claim 2, including stop means extending annularly around the splines at a location between the clutch plate and the ring gear; and said yieldable means comprising separate springs both abutting the stop means and each abutting one of the collar rings and separately urging the rings toward the clutch plate.

4. The device as claimed in claim 1, wherein said means for selectively actuating the ring nearest the clutch plate away therefrom comprises a fork member pivotally carried by the frame and engaging the last mentioned ring at one end, the member being displaced to actuate the ring by cam means coupled to be displaced, when the auxiliary motor means drives the ring gear.

* * * * *